United States Patent [19]
Mizoguchi

[11] Patent Number: 5,321,723
[45] Date of Patent: Jun. 14, 1994

[54] AUTOMATIC EQUALIZER

[75] Inventor: Shoichi Mizoguchi, Tokyo, Japan

[73] Assignee: NEC Corporation, Tokyo, Japan

[21] Appl. No.: 842,422

[22] Filed: Feb. 27, 1992

[30] Foreign Application Priority Data

Feb. 27, 1991 [JP] Japan ................................. 3-032544

[51] Int. Cl.$^5$ .............................................. H03H 7/30
[52] U.S. Cl. ......................................... 375/14; 375/12
[58] Field of Search ............................. 375/12, 14, 15; 364/724.01; 333/18, 28 R

[56] References Cited

U.S. PATENT DOCUMENTS

| | | | |
|---|---|---|---|
| 3,868,603 | 2/1975 | Guidoux | 375/15 |
| 4,271,525 | 6/1981 | Watanabe | 375/14 |
| 4,972,433 | 11/1990 | Yamaguchi et al. | 375/12 |
| 5,119,401 | 6/1992 | Tsujimoto | 375/14 |

FOREIGN PATENT DOCUMENTS 0028706  5/1981  European Pat. Off. .

OTHER PUBLICATIONS

Watanabe, K., "Adaptive Matched Filter And Its Significance To Anti-Multipath Fading", in *International Conference On Communications '86*, Jun. 1986, vol. 3, pp. 1455-1459.

Eleftherious, E., et al., "Adaptive Equalization Techniques for HF Channels", in *IEEE Journal on Selected Areas In Communications*, Feb. 1987, vol SAC5, No. 5, pp. 238-247.

Primary Examiner—Stephen Chin
Assistant Examiner—T. Ghebretinsae
Attorney, Agent, or Firm—Sughrue, Mion, Zinn, Macpeak & Seas

[57] ABSTRACT

An automatic equalizer includes an adaptive matched filter connected in front of a decision feedback equalizer of a conventional design. The adaptive matched filter has an A/D converter for sampling and quantizing an analog baseband signal into a digital signal, which is applied to a transversal filter. The transversal filter is supplied with tap coefficients adaptively controlled by a control signal generator which makes automatic adjustments to symmetrize the impulse response of a transmission path depending on the status of fading. The automatic equalizer can sufficiently equalize the fading in the range $p > 1$ in which the reflected wave is stronger than the direct wave, which fading cannot be adequately equalized only by the conventional decision feedback equalizer.

2 Claims, 7 Drawing Sheets

AUTOMATIC EQUALIZER

BACKGROUND OF THE INVENTION

1. Field of the Invention

The present invention relates to an automatic equalizer, and more particularly to a fully-digital-type automatic equalizer for use on the reception side of a digital radio communication system with multilevel quadrature amplitude modulation (multilevel QAM) or polar-phase modulation.

2. Description of the Related Art

In recent years, digital radio communications systems have employed, on the reception side thereof, the equalizer with transversal filters for preventing the circuit quality from being deteriorated by frequency selective fading produced in propagation paths. Equalizers with greater equalizing capabilities include the decision feedback equalizer.

One conventional fully-digital-type 5-tap decision feedback equalizer is shown in FIG. 1 of the accompanying drawings. An analog baseband signal applied from a demodulator (not shown) to input terminal 1 is supplied to gain adjusting circuit 11. Gain adjusting circuit 11 compresses the signal with a compression ratio of $1/K$ ($K > 1$ or $K = 1$) so that the level of the signal will not exceed the predetermined range of the input signal level of A/D converter 12 connected thereto even when the signal waveform is distorted due to fading in the propagation path. A/D converter 12 samples and quantizes the analog output signal from gain adjusting circuit 11 with clock signal $CLK_1$ of sampling frequency $f_c$ supplied from terminal 2 and supplies N-bit digital signal train $S_1$ to decision feedback transversal filter 101.

In decision feedback transversal filter 101, digital signal $S_1$ is applied to first multiplier 25 and first delay circuit 21. First delay circuit 21 applies a delayed output signal to second multiplier 26 and second delay circuit 22. Second delay circuit 22 applies a delayed output signal to third multiplier 27. Decision circuit 14 applies an output signal to third delay circuit 23 whose delayed output signal is supplied to fourth multiplier 28 and fourth delay circuit 24. Fourth delay circuit 24 applies a delayed output signal to fifth multiplier 29. Multipliers 25, 26, 27 and delay circuits 21, 22 jointly constitute a circuit that is referred to as pre-equalizer 201, and multipliers 28, 29 and delay circuits 23, 24 jointly make up a circuit that is referred to as post-equalizer 202.

Each of delay circuits 21 through 24 comprises a flip-flop or the like and delays the supplied signal by one bit. In multipliers 25 through 29, each of the supplied input signals is multiplied by tap coefficients $C_{-2}$, $C_{-1}$, $C_0$, $C_1$, $C_2$, respectively, supplied from control signal generator 102. The resultant products are supplied as multiplier output signals $m_{-2}$, $m_{-1}$, $m_0$, $m_1$, $m_2$ to adder 13. Adder 13 digitally adds supplied multiplier output signals $m_{-2}$, $m_{-1}$, $m_0$, $m_1$, $m_2$ and outputs equalized signal $S_{1A}$, from which intersymbol interference due to fading contained in original signal $S_1$ is removed, to post-processing circuit 15 and decision circuit 14. Decision circuit 14 determines an ideal signal level closest to the level of the supplied binary signal, and outputs a signal of the determined signal level as decision signal $S_{1B}$. As a result, since post-equalizer 202 is supplied with decision signal $S_{1B}$ from which waveform distortion due to fading or the like has been removed, intersymbol interference that can be removed by post-equalizer 202 is completely equalized unless the tap coefficients supplied to multiplier 28, 29 are accurate and the multiplier output signals are saturated. Post-processing circuit 15 is used to restore the original signal, which has been compressed to $1/K$ by gain adjusting circuit 11, back to the original level, and outputs a signal with the properly corrected level from terminal 3.

Operation of decision circuit 14 and post-processing circuit 15 will be described in specific detail with reference to FIG. 2 of the accompanying drawings. It is assumed that the input signal applied to the terminal 1 is a 4-valued signal which is a baseband signal modulated according to 16-valued quadrature amplitude modulation (16QAM). The ideal values of the 4-valued signal have levels indicated by white dots A, B, C, D (FIG. 2) as the input signal applied to A/D converter 12, white dots A, B, C, D corresponding to 2-bit information signals (00), (01), (10), (11), respectively, each composed of the first and second bits when the compression ratio is 1. Third or greater bits of the output signal from A/D converter 12 are an error signal indicating a deviation from the ideal values. If compression ratio $1/K$ is 1/2, then dots A, B, C, D are reduced in amplitude to half, and compressed to respective black dots $A_1$, $B_1$, $C_1$, $D_1$. The ideal values of dots $A_1$, $B_1$, $C_1$, $D_1$ are represented by 3-bit signals (010), (011), (100), (101), respectively. Then, fourth or greater bits of the output signal from A/D converter 12 are an error signal indicating a deviation from the ideal values. Inasmuch as equalized output signal $S_{1A}$ from decision feedback transversal filter 101 contains thermal noise and intersymbol interference that cannot be removed, the error signal varies at random. Therefore, if first- through Nth-bit signals were fed back directly to post-equalizer 202, the signal could not be appropriately equalized since the input signals to post-equalizer 202 contain errors. To solve the above problem, decision circuit 14 uniquely determines the first through third bits to be any one of four ideal values 010, 011, 100, 101 and also determines the fourth and greater bits to be fixed value $100 \sim 0 (\sim$ indicates all 0) according to the output signal of the decision circuit shown in FIG. 2 when digital signal $S_{1A}$ is inputted, thereby producing decision signal $S_{1B}$. If $N = 5$, then when digital signal $S_{1A} = 10011$ is inputted, decision signal $S_{1B} = 10010$ is produced, and when digital signal $S_{1A} = 11100$ is inputted, decision signal $S_{1B} = 10110$ is produced. To double the 1/2-compressed signal into the original signal, post-processing circuit 15 converts the supplied signal according to the output signal from the post-processing circuit shown in FIG. 2, thereby producing 3-bit signals of path 1, path 2 and path 3. For example, when digital signal $S_{1A} = 10011$ is inputted, post-processing circuit 15 produces output signal $D = 101$, and when digital signal $S_{1A} = 11100$ is inputted, post-processing circuit 15 produces output signal $D = 111$. Paths 1, 2 are information bits, and path 3 is an error bit indicating the polarity of the error signal. Tap coefficients $C_{-2}$, $C_{-1}$, $C_0$, $C_1$, $C_2$ are obtained from control signal generator 102 which operates exclusive-OR calculations between polarity signal d (path 1) indicative of the polarity of the received signal and error signal e (path 3), averages the result over time and outputs the averaged output. The principles of generating the tap coefficients are described in detail, for example, in Chapter 11 of "Digital Signal Processing" edited and published by the Institute of Electronics, Information and Communication Engineering, 1975 in Japan FIG. 3 of the accompanying drawings illustrates an instance of two-ray fading to which the two-ray fading equalizing characteristic of the above conventional decision feedback equalizer is applied. Curve S shown in FIG. 3 is also referred to as a signature curve. The graph of FIG. 3 has a horizontal axis representing notch position fd which indicates the shift of the fading notch frequency from the center of the spectrum of a desired signal, the shift being normalized by the clock frequency, and a vertical axis representing amplitude ratios $\rho$ which indicate amplitudes of the reflected wave (delayed wave) normalized by amplitudes of the principal wave. Notch depth Dn is expressed by $Dn = -20 \log (1-\rho)$dB. Using notch position fd and amplitude ratio $\rho$ as parameters, curve S is plotted by interconnecting points fd and $\rho$ where error ratio $P = 1 \times 10^{-4}$. Error ratio P is greater than $10^{-4}$ in the area that is surrounded by curve S in FIG. 3 Therefore, it can be understood that the smaller the area surrounded by curve S, the greater the ability of the equalizer. In the range $0 < \rho < 1$, since the interference wave is delayed with respect to the principal wave, intersymbol interference is removed by the post-equalizer. In the range of $\rho > 1$, intersymbol interference is removed by the pre-equalizer 201 as the delayed wave becomes the principal wave. In the decision feedback equalizer, the input signal applied to the post-equalizer is an equalized decision signal and its value is substantially the same as the ideal value. Therefore, the signal is equalized substantially completely in the range $0 < \rho < 1$ in FIG. 3. In the range $\rho > 1$, inasmuch as intersymbol interference is not removed from the input signal applied to the pre-equalizer, the equalizing ability is lower than in the range $0 < \rho < 1$. The input level, the tap coefficients, and the output level of the multipliers in the pre- and post-equalizers have values ranging from notch position $-1$ to notch position $+1$.

With the conventional decision feedback equalizer described above, since the improving capability is not good in the range $\rho > 1$ in which the delayed wave is more intensive than the principal wave, as indicated by signature curve S in FIG. 3, the outage probability is not effectively improved in a digital microwave communications system in which the conditions $\rho < 1$ and $\rho > 1$ occur with substantially equal probability.

SUMMARY OF THE INVENTION

It is an object of the present invention to provide a fully-digital-type automatic equalizer capable of equalizing fading interference in the range $\rho > 1$ in which a reflected wave is more intensive than a direct wave and fading interference cannot be adequately equalized by the conventional decision feedback equalizer.

According to the present invention, there is provided an automatic equalizer comprising a gain adjusting circuit for compressing, at a predetermined ratio, the amplitude of an analog baseband signal supplied from a demodulator, the analog baseband signal having intersymbol interference due to fading of a propagation path; an A/D converter for converting an analog output signal from the gain adjusting circuit into a digital signal with an externally supplied clock signal; a decision feedback equalizer comprising a decision feedback transversal filter having a pre-equalizer for removing intersymbol interference from the digital signal supplied from the A/D converter if $\rho > 1$ ($\rho$ is the ratio of the amplitude of a reflected wave to the amplitude of a principal wave), a post-equalizer for removing intersymbol interference from the digital signal from the A/D converter if $0 < \rho < 1$, and an adder for adding output signals from the pre-equalizer and the post-equalizer, a control signal generator for supplying tap coefficients to the decision feedback transversal filter, a decision circuit for determining the ideal signal level closest to an output signal from the adder and feeding the ideal signal level back to the post-equalizer, and a post-processing circuit for restoring the amplitude of the output signal from the adder to the amplitude of the analog baseband signal before it is compressed by the gain adjusting circuit; and an adaptive matched filter connected between the A/D converter and the decision feedback equalizer, for symmetrizing an asymmetric impulse response, due to intersymbol interference, of the digital signal from the A/D converter.

The automatic equalizer further includes a frequency multiplier for multiplying, by n (n is an integer of 2 or more), the frequency of the externally supplied clock signal into a sampling frequency to be supplied to the A/D converter, and the adaptive matched filter has a transversal filter having tap intervals of T/n (second) (T is the reciprocal of the symbol frequency of the externally Supplied clock signal).

The adaptive matched filter further includes a control signal generator for detecting the correlation between the digital signal supplied from the A/D converter to the transversal filter and an output signal supplied from the transversal filter, generating tap coefficient signals by averaging the detected correlation over time, and supplying the generated tap coefficient signals to the transversal filter.

The adaptive matched filter also includes a transversal filter and a latch for latching an output signal from the transversal filter at intervals of T and outputting the latched signal to the decision feedback equalizer.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 4:
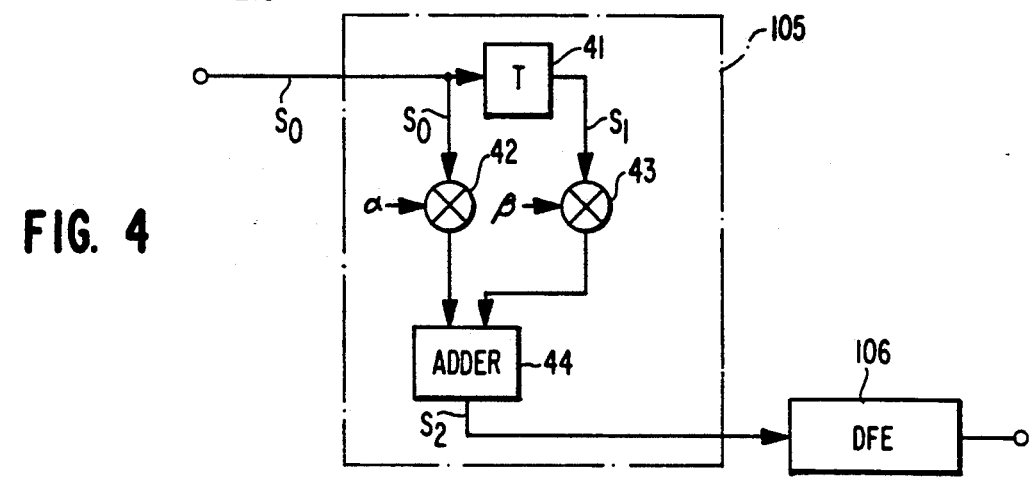
FIG. 4 is a block diagram showing the principles of an adaptive matched filter added to the present invention.
Figure 5A:
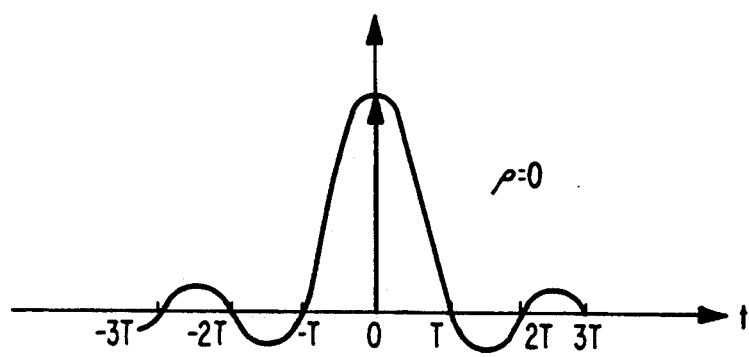
FIGS. 5(a), 5(b) and 5(c) are diagrams of impulse responses illustrative of the principles shown in FIG. 4.
Figure 5B:
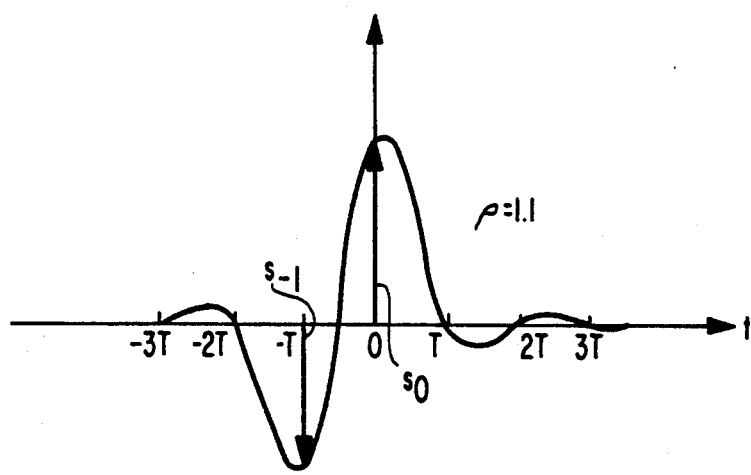
Figure 5C:
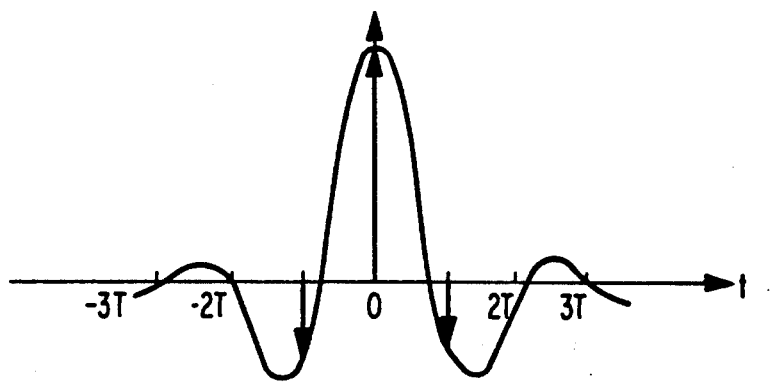
Figure 6A:
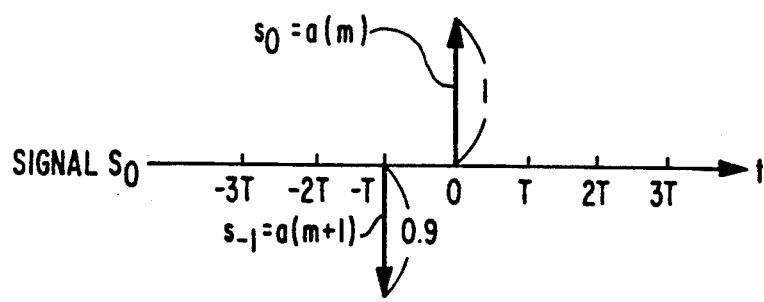
FIGS. 6(a), 6(b) and 6(c) are diagrams illustrative of the principles shown in FIG. 4.
Figure 6B:
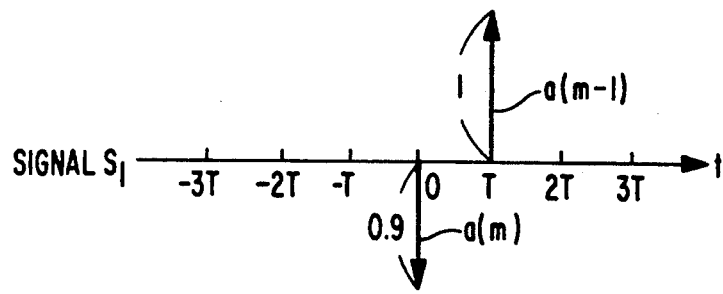

Before entering into a detailed description of the present invention, the principles of the adaptive matched filter added to the present invention will first be described below with reference to FIGS. 4, 5(a) through 5(c) and 6(a) through 6(c). FIG. 4 shows 2-tap transversal filter 105 in an adaptive matched filter. Usually, for transmitting pulses without intersymbol interference through a transmission path with a band limitation, used in digital microwave communications, an impulse response of the entire transmission system must be zero at each time interval of T except for the central peak, as shown in FIG. 5(a). If, however, the transmission path includes two paths, one each for direct and reflected waves, then these waves interfere with each other, producing multipath fading. At this point, when the reflected wave is larger in amplitude than the direct wave ($\rho > 1$), the impulse response of the transmission path suffers from major intersymbol interference at the time $t = -T$, as shown in FIG. 5(b). If principal wave $s_0$ ($= a(m)$) and intersymbol interference $s_{-1}$ ($= a(m+1)$) at the time $t = -T$ are indicated by the arrows shown in FIG. 6(a), then the principal wave and the intersymbol interference as they are delayed by T are shown in FIG. 6(b). In the case where the 2-tap transversal filter 105 comprises delay circuit 41, multipliers 42, 43, and adder 44 as shown in FIG. 4, signal $S_0$ is indicated by FIG. 5(a) and signal $S_1$ by FIG. 5(b). The adder 44 produces output signal $S_2$ which is expressed as follows:

$$S_2 = \alpha \times S_0 + \beta \times S_1 \quad (1)$$

If the $\alpha = 1/1.9$ and $\beta = -1/1.9$, then output signal $S_2$ is given according to following equation (2):

$$S_2 = 1/1.9 \times S_0 + (-1/1.9) \times S_1 \quad (2)$$

Figure 6C:
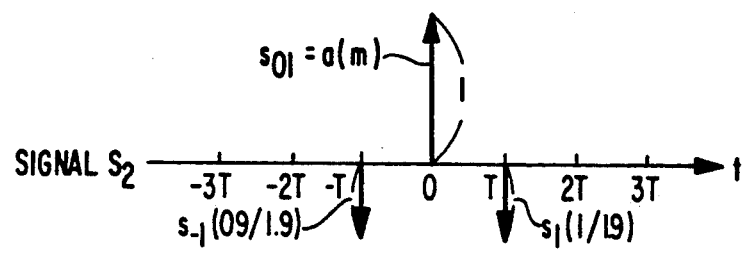

Therefore, output signal $S_2$ is indicated as shown in FIG. 6(c). With the tap coefficients $\alpha, \beta$ given to transversal filter 105, when input signal $S_0$ which has been subjected to major intersymbol interference $s_{-1}$ due to the advance wave, as shown in FIG. 6(a), passes through transversal filter 105, the intersymbol interference of the impulse response of input signal $S_0$ is dispersed into symmetric intersymbol interferences $s_{-1}, s_1$ before and after the principal signal $S_0$ ($t=0$). It is to be noted that due to the dispersion, the magnitudes of intersymbol interferences $s_{-1}, s_1$ are reduced to about ½ of intersymbol interference $s_{-1}$ before it is dispersed. If the pre-equalizer of the conventional decision feedback equalizer has an equalizing ability limited to the magnitudes of intersymbol interferences $s_{-1}, s_1$ of 0.5 or less and the post-equalizer has an equalizing ability limited to the magnitude of intersymbol interference $s_1$ of 0.9 or less, then in the absence of transversal filter 105, i.e., only with conventional decision feedback equalizer 106, intersymbol interference $s_{-1} = 0.9$ of signal $S_0$ can not be equalized, but with transversal filter 105 preceding conventional decision feedback equalizer 106, intersymbol interference $s_{-1} = 0.9/1.9$, i.e., about 0.47, and the intersymbol interference $s_1 = 1/1.9 = 0.53$ are completely equalized. The transversal filter with this function is referred to as a matched filter.

According to the present invention, an automatic equalizer comprises a fully-digital-type adaptive matched filter in the form of a fully digital circuit combined with a tap coefficient generator which is capable of adaptively automatically adjusting tap coefficients to be given to the adaptive matched filter depending on the impulse response of a transmission path, i.e., the status of fading, and a fully-digital-type decision feedback equalizer that is preceded by the adaptive matched filter. The automatic equalizer according to the present invention is capable of equalizing fading in the range $\rho > 1$ which has not been adequately equalized heretofore.

Figure 1:
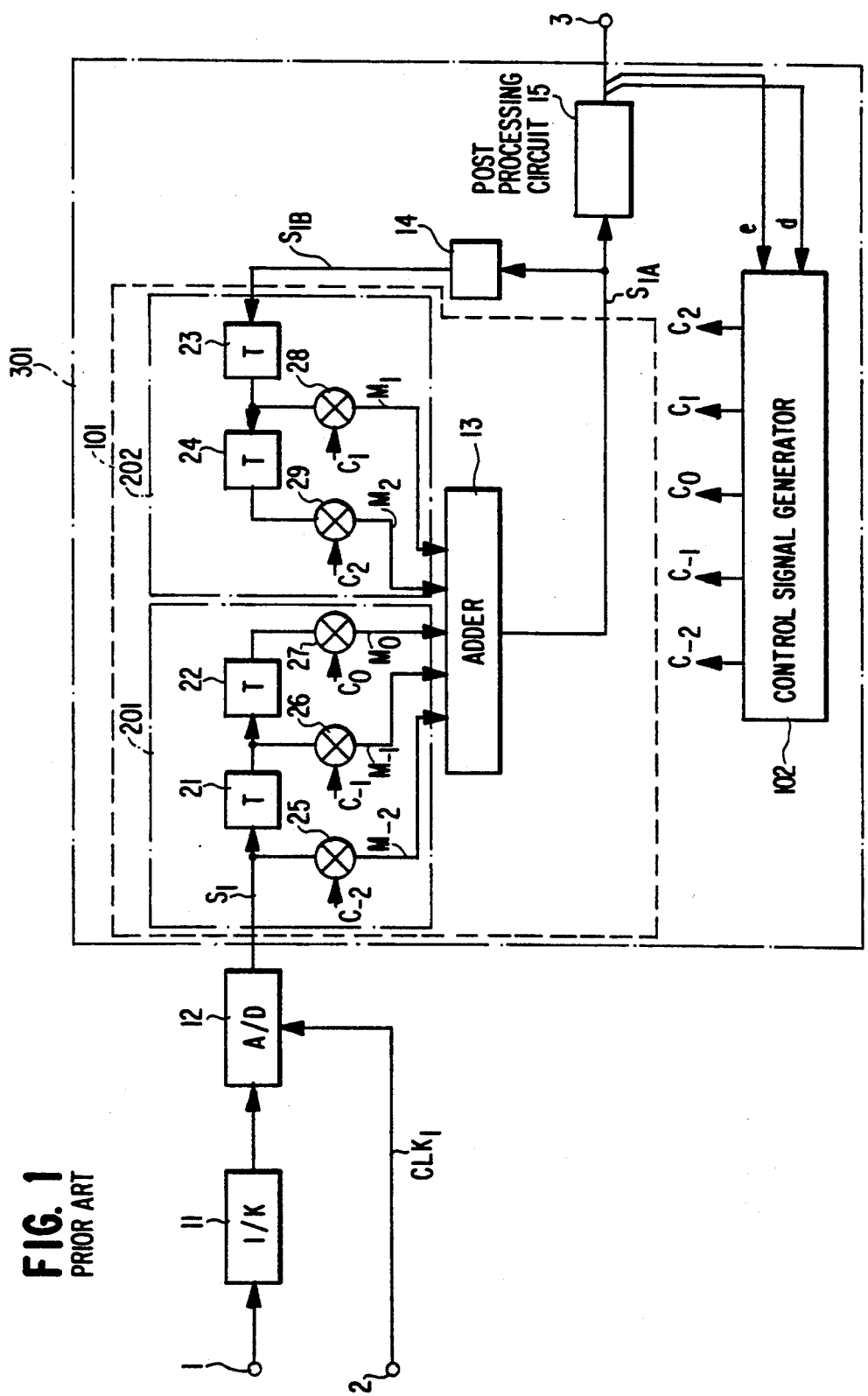
FIG. 1 is a block diagram of a conventional fully-digital-type 5-tap decision feedback equalizer.
Figure 2:
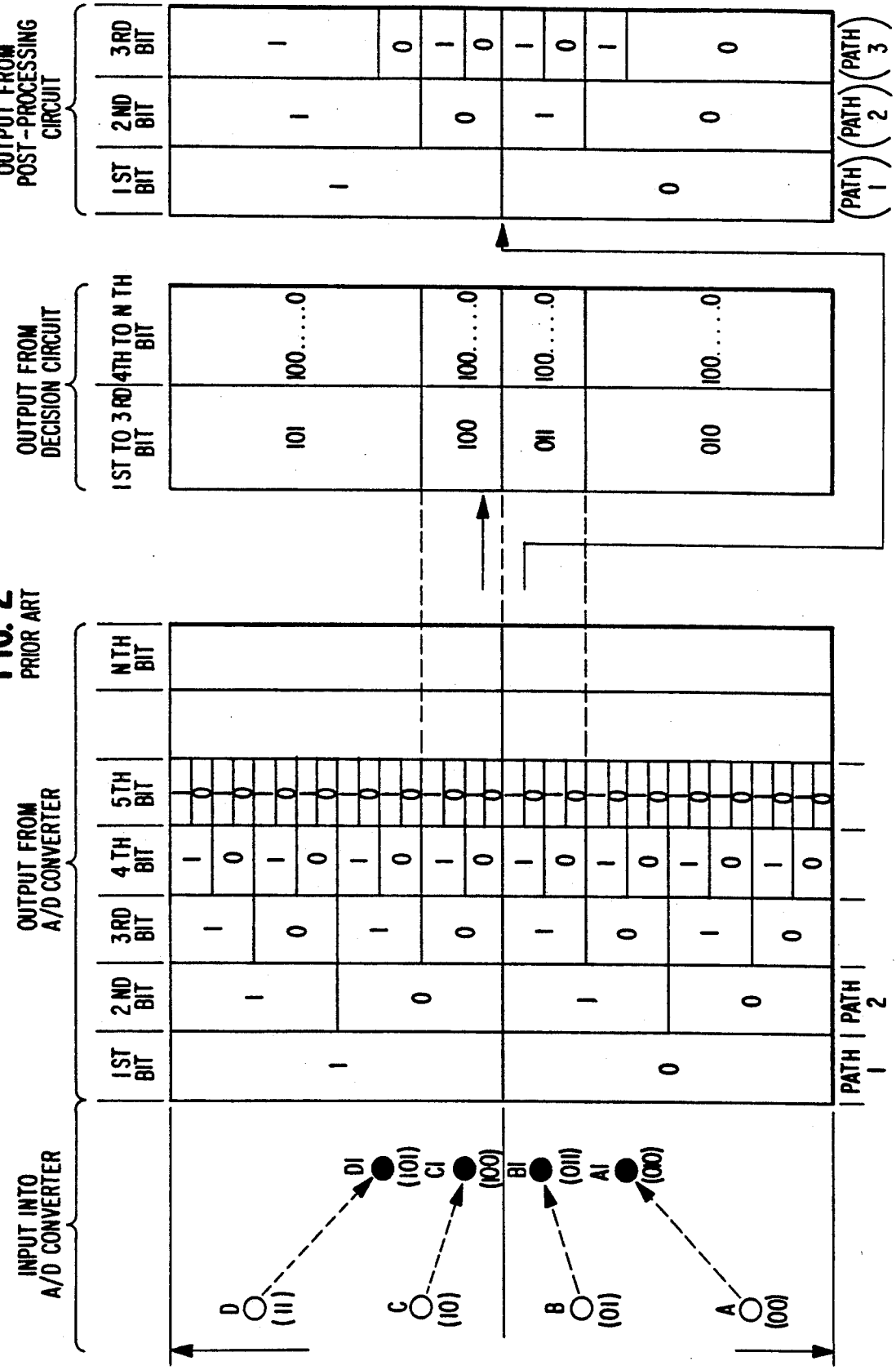
FIG. 2 is a diagram illustrative of the manner in which signals are processed by circuits of the conventional decision feedback equalizer shown in FIG. 1.

Now, an automatic equalizer according to a specific embodiment of the present invention will be described below with reference to FIG. 7. Parts of the automatic equalizer shown in FIG. 7 which are identical to those of the conventional decision feedback equalizer shown in FIG. 1 are denoted by identical reference symbols, and will not be described in detail.

Figure 7:
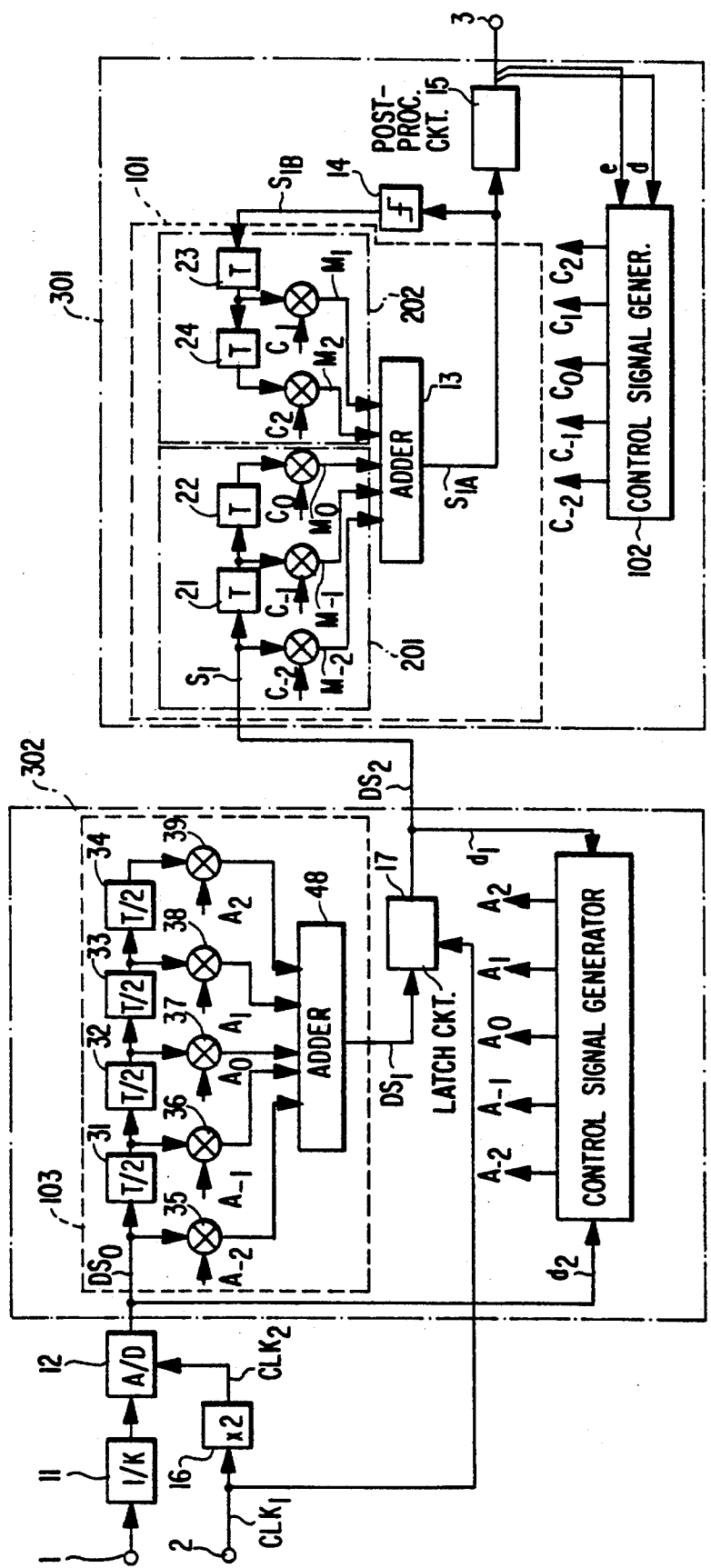
FIG. 7 is a block diagram of an automatic equalizer according to the present invention.

As shown in FIG. 7, the automatic equalizer has, in addition to input terminals 1, 2, gain adjusting circuit 11, A/D converter 12, and decision feedback equalizer (DFE) 310, which are identical to those of the conventional circuit arrangement, frequency doubler 16 for doubling the frequency of clock signal CLK$_1$ supplied to input terminal 2, and adaptive matched filter (AMF) 302. Adaptive matched filter 302 comprises 5-tap transversal filter 103, a tap coefficient or control signal generator 104, and latch 107.

An analog baseband signal applied from a demodulator (not shown) to input terminal 1 is supplied to gain adjusting circuit 11. Gain adjusting circuit 11 compresses the signal gain with a compression ratio of 1/K ($K > 1$ or $K = 1$) so that the level of the signal will not exceed a predetermined range of the input signal level of A/D converter 12 connected thereto even when the signal waveform is distorted due to fading in the propagation path. The compressed signal is then applied to A/D converter 12. Clock signal CLK$_1$ of frequency $f_c$ which is supplied to input terminal 2 is doubled in frequency by frequency doubler 16, which applied clock signal CLK$_2$ of sampling frequency $2f_c$ to A/D converter 12. A/D converter 12 then samples and quantizes the analog output baseband signal from gain adjusting circuit 11 with the sampling frequency $2f_c$, and supplies N-bit digital signal train DS$_0$ to 5-tap transversal filter 103.

5-tap transversal filter 103 comprises first through fourth delay circuits (each having a delay time T/2) 31 through 34 that are connected in cascade, first multiplier 35 connected to the input terminal of first delay circuit 31, second through fifth multipliers 36 through 39 connected respectively to the output terminals of first through fourth delay circuits 31 through 34, and adder 40 for adding output signals from respective first through fifth multipliers 35 through 39. To first through fifth multipliers 35 through 39, there are supplied respective tap coefficients A$_{-2}$, A$_{-1}$, A$_0$, A$_1$, A$_2$ from control signal generator 104 which produces tap coefficient signals. Adder 40 produces sum output signal DS$_1$ indicative of the sum of the products from first through fifth multipliers 35 through 39. Sum output signal DS$_1$ serves to symmetrize an asymmetric impulse response caused by the multipath fading transmission path. In the illustrated embodiment, the tap interval (i.e., the delay time of each of delay circuits 31 through 34) is selected to be T/2 (T is the reciprocal of $f_c$) because the impulse response can be adequately symmetrized even if the delay time between direct and reflected waves is of a value close to T/2 or 3/2·T. Transversal filter 103 may have more or less taps than the five taps. Each of delay circuits 31 through 34 may comprise a flip-flop which operates in response to a supplied clock signal having frequency $2f_c$.

The output signal from adder 40 has a period of T/2. However, since the information signal necessary to obtain the signal train to be transmitted appears at the period of T, the other signal components in transient are unnecessary. Therefore, latch 17, which may comprise a flip-flop which operates in response to the supplied clock signal having frequency $f_c$, selects the information signal at each interval of T and outputs the selected signal as output signal $DS_2$ of adaptive matched filter 302 to decision feedback equalizer 301. Even if impulse response of input signal $DS_0$ supplied to adaptive matched filter 302 is subjected to a major intersymbol interference at the time $t= -T$ due to multipath fading of $\rho=1.1$, as shown in FIG. 6(b), the impulse response of output signal $DS_2$ of adaptive matched filter 302 is symmetric, as shown in FIG. 6(c). That is, the major intersymbol interference at the time $t= -T$, as shown in FIG. 6(b), which cannot be equalized by the decision feedback equalizer, is converted into small intersymbol interferences at the time $t= +T$ and $-T$, as shown in FIG. 6(c), and these small intersymbol interferences can be adequately equalized by decision feedback equalizer 301.

Figure 8:
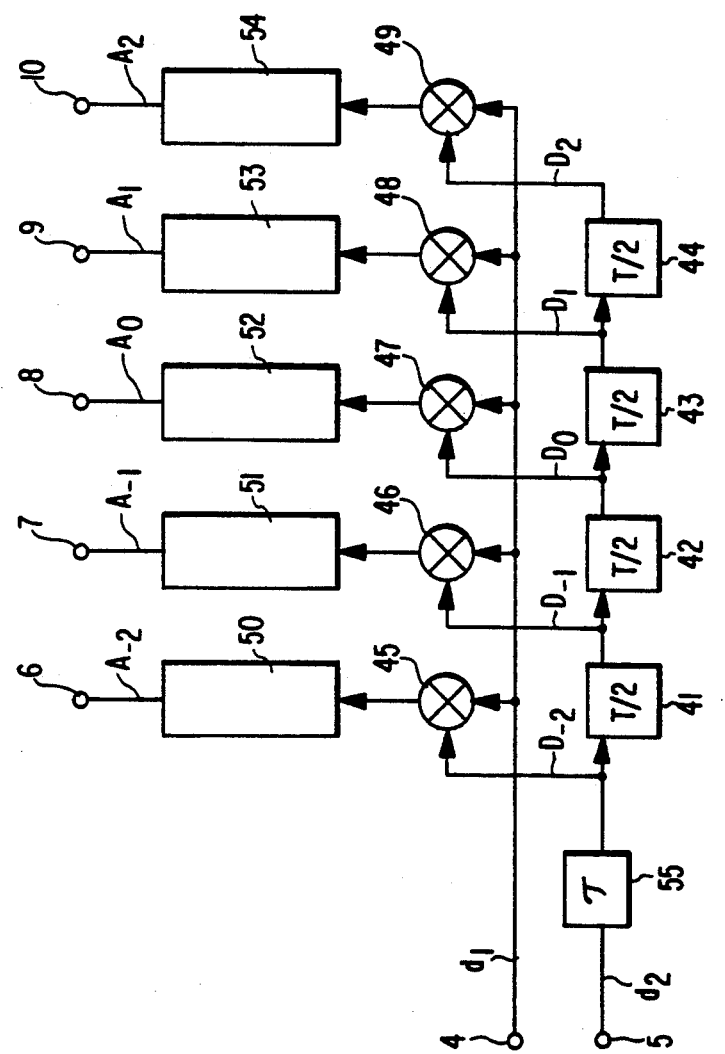
FIG. 8 is a block diagram of a tap coefficient or control signal generator for the adaptive matched filter in the automatic equalizer shown in FIG. 7.

Tap coefficient or control signal generator 104 will be described below with reference to FIG. 8. Tap coefficient generator 104 shown in FIG. 8 comprises cascaded delay circuits 41 through 44 each having delay time T/2, delay circuit 55 having delay time $\tau$, multipliers 45 through 49 connected respectively to the output terminals $D_i$ ($i = -2, -1, 0, 1, 2$) of delay circuits 55, 41 through 44 and also connected to the output terminal of latch 17, and time averaging circuits 50 through 54 connected respectively to the output terminals of multipliers 45 through 49. Digital signal $d_1$ which is composed of m bit (1<m<M) from the MSB (most significant bit) of output signal $DS_2$ (M-bit digital signal) from adaptive matched filter 302 shown in FIG. 7 is applied to terminal 4 shown in FIG. 8. Digital signal $d_2$ which is composed of n bits (1<n<N) from the of input signal $DS_0$ (N-bit digital signal) applied to adaptive matched filter 302 is applied to terminal 5 shown in FIG. 8. Delay circuit 55 serves to compensate for the delay caused by multiplier 37, adder 40, and latch 17 shown in FIG. 7. If the delay to be compensated for by delay circuit 55 is sufficiently small with respect to the delay T/2, then delay circuit 55 may be dispensed with. It is assumed that the impulse response is as shown in FIG. 6(a). If a transmitted symbol train is indicated by a(m) (m is an integer), then $s_0=a(m)$ and $s_{-1}=a(m+1)$ in FIG. 6(a), and $s_{01}=a(m)$ in FIG. 6(c). That is, $d_1=a(m)$. As described above with respect to the principles of the present invention, in order to obtain a symmetrized impulse response as shown in FIG. 6(c), it is necessary to find a tap producing an impulse response, as shown in FIG. 6(b), with a(m) being present at the time $t=0$. Stated otherwise, a tap having the largest correlation to $d_1$ ($=a(m)$) may be located. Tap coefficients $A_i$ ($i = -2, -1, 0, 1, 2$) shown in FIG. 8 can be determined from the average of $d_1 \times D_i$. As can be seen from the average of $A_0=d_1 \times D_0$ and FIG. 6(b), the average of $A_2=d_1 \times D_2$ exhibits the largest correlation to $d_1$. When two tap coefficients $A_0$, $A_2$ are $A_0=\alpha -1/1.9$, $A_2=\beta --1/1.9$, the impulse response is substantially symmetrized as shown in FIG. 6(c). Tap coefficients $A_{-2}$, $A_{-1}$, $A_0$, $A_1$, $A_2$ thus produced are applied respectively to multipliers 35 through 39 of transversal filter 103. Each of time averaging circuits 50 through 54 comprises a digital adder and a divider. Time averaging circuits 50 through 54 produce respective tap coefficients $A_{-2}$, $A_{-1}$, $A_0$, $A_1$, $A_2$ by digitally adding the output signals from multipliers 45 through 49 for predetermined number L of times, and dividing the sums by number L. Therefore, tap coefficient $A_i$ is given by the following equation (3):

$$A_i = \frac{\sum_{k=1}^{L}(d_1(k) \times D_i \times (k))}{L} \quad (3)$$

Alternatively, using the method of moving averaging, following equation (4) may be used for calculating tap coefficients:

$$A_i(l) = \frac{\sum_{k=l}^{l+L-1}(d_1(k) \times D_i(k))}{L} \quad (4)$$

where k, l are integers.

Figure 3:
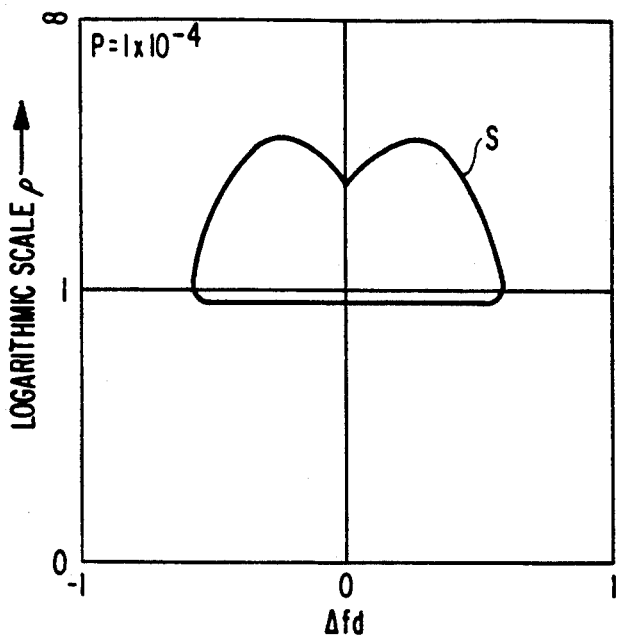
FIG. 3 is a diagram showing a signature of the conventional decision feedback equalizer shown in FIG. 1.
Figure 9:
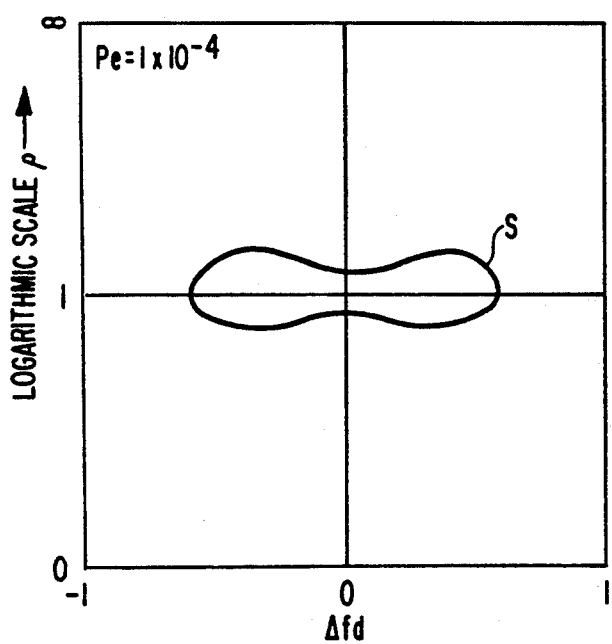
FIG. 9 is a diagram showing a signature of the automatic equalizer shown in FIG. 7.

By combining adaptive matched filter 302 and decision feedback equalizer 301, as described above, the automatic equalizer according to the present invention has a signature, as shown in FIG. 9. The fading equalizing characteristic of the automatic equalizer in the range $\rho>1$ is greatly improved with respect to the signature (FIG. 3) of only the conventional decision feedback equalizer.

While the illustrated adaptive matched filter has five taps, it may have any other number of taps, and provides greater advantages as the number of taps used is greater. The sampling frequency of clock signal $CLK_2$ is not limited to twice the frequency of the input clock signal, but may be another multiple of the frequency of the input clock signal.

With the present invention, as described above, the fully-digital-type adaptive matched filter for symmetrizing the impulse response of the transmission path is connected in front of the decision feedback equalizer and the tap coefficients are adaptively controlled depending on the status of fading according to the method of detecting the correlation. Therefore, the automatic equalizer according to the present invention is capable of equalizing intersymbol interference which cannot be adequately equalized by the conventional decision feedback equalizer, where the reflected wave is more intensive than the direct wave.

Although a certain preferred embodiment of the present invention has been shown and described in detail, it should be understood that various changes and modifications may be made therein without departing from the scope of the appended claims.

What is claimed is:

1. An automatic equalizer comprising:
   a gain adjusting circuit for compressing, at a predetermined ratio, the amplitude of an analog baseband signal supplied from a demodulator, said analog baseband signal having intersymbol interference due to fading of the propagation path;
   an A/D converter for converting the analog output signal from said gain adjusting circuit into a digital signal with an externally supplied clock signal;

an adaptive matched filter comprising a transversal filter having tap intervals of T/n, T being the reciprocal of a symbol frequency of the externally supplied clock signal, said transversal filter receiving the digital signal from said A/D converter for symmetrizing the asymmetric impulse response of the transmission path due to multi-path fading, a control signal generator for supplying tap coefficients to said transversal filter, and a latch circuit for latching an output signal from said transversal filter at intervals of T and outputting the latched signal to said decision feedback equalizer, said latched signal also serving as an input to said control signal generator associated with said adaptive matched filter, so that a correlation between said digital signal received by said transversal filter and an output signal supplied by said transversal filter can be detected, and said control signal generator including a plurality of time averaging circuits, said tap coefficients being generated by averaging the detected correlation over time; and a decision feedback equalizer connected to said adaptive matched filter, comprising a decision feedback transversal filter having a pre-equalizer for removing intersymbol interference from the digital signal supplied from said adaptive matched filter if $\rho > 1$ ($\rho$ is the ratio of the amplitude of a reflected wave to the amplitude of a principal wave), a post-equalizer for removing intersymbol interference form the digital signal from said adaptive matched filter if $0 < \rho < 1$, and an adder for adding output signals from said pre-equalizer and said post-equalizer, a control signal generator for supplying tap coefficients to said decision feedback transversal filter, a decision circuit for determining a signal level of said analog baseband signal at a sending side modulator closest to the output signal from said adder and feeding said signal level back to said post-equalizer, and a post-processing circuit for restoring the amplitude of the output signal from said adder to the amplitude before it is compressed by said gain adjusting circuit;

wherein a frequency multiplier multiplies the frequency of the externally supplied clock signal by n (n is an integer equal to 2 or more) into a sampling frequency to be supplied to said A/D converter.

2. An automatic equalizer according to claim 1, wherein said control signal generator of said adaptive matched filter detects the correlation between the digital signal supplied from the A/D converter to said transversal filter and an output signal supplied from said latch circuit and generates tap coefficient signals by averaging the detected correlation over time to supply the generated tap coefficient signals to said transversal filter.

* * * * *

UNITED STATES PATENT AND TRADEMARK OFFICE
CERTIFICATE OF CORRECTION

PATENT NO. : 5,321,723

DATED : June 14, 1994

INVENTOR(S) : Mizoguchi

It is certified that error appears in the above-identified patent and that said Letters Patent is hereby corrected as shown below:

Column 7, line 43, change after "the", insert --MSB--.

Signed and Sealed this

Eleventh Day of October, 1994

Attest:

BRUCE LEHMAN

Attesting Officer

Commissioner of Patents and Trademarks